UNITED STATES PATENT OFFICE.

CLINTON DANIELS, OF ELKHORN, WISCONSIN.

IMPROVEMENT IN COMPOSITIONS FOR TANNING LEATHER.

Specification forming part of Letters Patent No. 19,756, dated March 30, 1858.

*To all whom it may concern:*

Be it known that I, CLINTON DANIELS, of Elkhorn, in the county of Walworth and State of Wisconsin, have invented a new and Improved Mode of Tanning Hides and Skins; and I do declare that the following is a full and exact description thereof, reference being had to the accompanying specification, and to the letters of reference marked thereon.

The nature of my invention consists in making a liquor by dissolving in water *Acacia catechu*, cream of tartar, and bicarbonate of soda, and using them as hereinafter described, in which said liquor hides and skins can be thoroughly tanned in from ten to thirty days, according to the condition and thickness of the hides and skins.

To enable others skilled in the art of tanning to make and use my invention, I will proceed to describe the process of making the liquor I use for tanning hides and skins, and its use.

I take twenty pounds of catechu (being the extract of *Acacia catechu*) and put it into a brass or copper vessel. I then pour into the said vessel ten gallons of water and put it over an ordinary wood-fire, and there let it remain until the catechu is dissolved. I stir the liquor while it is heating and skim off the scum that arises on the top of the liquor. After this I put the liquor into a barrel and let it remain there for two hours, during which time a sediment will settle at the bottom of the barrel. I then dip this liquor out and put it into a common vat, leaving the sediment aforesaid in the barrel. The vat I use is the same as those used in ordinary tanneries, and will hold fifteen hides, each weighing sixty pounds when green, and liquor enough to tan them in. After the liquor is put into the vat, as aforesaid, I then add to it a quantity of water sufficient to cover fifteen hides of the weight aforesaid. I then dissolve one-fourth of a pound of cream of tartar and one-fourth of a pound of bicarbonate of soda in one gallon of water, and then add this solution to the liquor in the vat. I then prepare fifteen hides of the weight aforesaid, in the ordinary way of preparing hides for tanning, and put them into the liquor in the vat and let them remain there one day. During that time I take them out and air them three (3) times, letting the hides remain out of the liquor twenty minutes at each time when taken out to be aired. After the hides have been in the liquor one day, as aforesaid, I then take ten pounds of catechu and dissolve it in water the same manner as before described. I then add this liquor to the liquor already in the vat, and I continue to add ten pounds of the catechu, dissolved as aforesaid, each day for five (5) days in succession, to the liquor in the said vat. I then take fifteen pounds more of the catechu, one-fourth of a pound of cream of tartar, one-fourth of a pound of bicarbonate of soda, and dissolve them the same as before described. I then add this liquor to the liquor which is already in the said vat, and continue to add fifteen pounds of the catechu, dissolved as before, to the said liquor in the vat, each day for three (3) days in succession. After the first day I take the hides out of the liquor and air them one hour each day until they are tanned. I let the hides remain in the liquor last aforesaid until they are thoroughly tanned through, which is from twelve to fifteen days in all. The hides I then take out of the liquor and finish in the ordinary way.

I use one hundred and forty pounds of catechu, one-half of a pound of cream of tartar, one-half of a pound of bicarbonate of soda, dissolved as aforesaid, in tanning nine hundred pounds of green hides, and the same quantity of catechu, cream of tartar, and bicarbonate of soda in proportion to that number of pounds of hides in all cases.

The samples of leather which accompany this specification were tanned by myself according to the mode above described, and are designated as follows: That marked "A" is finished cowhide, that marked "B" is unfinished cowhide, that marked "C" is sole-leather, that marked "D" is unfinished harness-leather, that marked "E" is finished harness-leather, and that marked "F" is finished calf-skin.

The samples of ingredients used by me in preparing the liquor for tanning, as aforesaid, also accompany the specification, and are done up in papers marked "G," "H," and "I," respectively. That marked "G" is catechu, that marked "H" is cream of tartar, and that marked "I" is bicarbonate of soda.

What I claim as my invention, and desire to secure by Letters Patent, is—

The combination and use of cream of tartar and bicarbonate of soda with catechu in making a liquor, and using the same for tanning hides and skins, no claim whatever being made to the discovery and use of the catechu alone for tanning purposes by me.

CLINTON DANIELS.

Witnesses:
WILLIAM C. NORTON,
WM. WALKER.